(12) United States Patent
Lin et al.

(10) Patent No.: US 8,203,811 B2
(45) Date of Patent: Jun. 19, 2012

(54) PROTECTION APPARATUS AND METHOD FOR A POWER CONVERTER

(75) Inventors: Tzu-Chen Lin, Taipei (TW); Pei-Lun Huang, Zhubei (TW)

(73) Assignee: Richtek Technology Corp., Hsinchu (TW)

( * ) Notice: Subject to any disclaimer, the term of this patent is extended or adjusted under 35 U.S.C. 154(b) by 297 days.

(21) Appl. No.: 12/437,934

(22) Filed: May 8, 2009

(65) Prior Publication Data

US 2009/0279214 A1 Nov. 12, 2009

(30) Foreign Application Priority Data

May 12, 2008 (TW) .............................. 97117447 A

(51) Int. Cl.
*H02H 7/10* (2006.01)
(52) U.S. Cl. ......................................................... 361/18
(58) Field of Classification Search ..................... 361/18
See application file for complete search history.

(56) References Cited

U.S. PATENT DOCUMENTS

| 4,879,624 A | * | 11/1989 | Jones et al. | 361/65 |
| 5,585,993 A | * | 12/1996 | Guillon et al. | 361/94 |
| 2005/0068008 A1 | * | 3/2005 | Zhang | 320/134 |
| 2007/0242488 A1 | * | 10/2007 | Baurle et al. | 363/21.12 |

* cited by examiner

*Primary Examiner* — Rexford Barnie
*Assistant Examiner* — Ann Hoang
(74) *Attorney, Agent, or Firm* — Rosenberg, Klein & Lee

(57) ABSTRACT

A power converter uses a PWM controller to provide a driver output to modulate the duty of the power converter. A protection apparatus and method compare a current sense input of the PWM controller with a reference voltage to assert a signal representing failure, count the number of cycles where the signal representing failure is asserted, and reset an enable signal to inhibit the driver output if the signal representing failure is asserted in several cycles.

10 Claims, 5 Drawing Sheets

PROTECTION APPARATUS AND METHOD FOR A POWER CONVERTER

FIELD OF THE INVENTION

The present invention is related generally to a power converter and, more particularly, to a protection apparatus and method for a power converter.

BACKGROUND OF THE INVENTION

A power converter uses a pulse width modulation (PWM) controller to modulate the duty of the power converter in order to regulate the output voltage of the power converter. In further detail, the duty of a power converter modulated by a PWM controller will determine the on time of the power switch in the power supply unit (PSU) or power stage of the power converter. At a regular PWM controller, there is usually a current sense input to implement current limit or total power limit of the power converter. If the current sense input is short, the current limit or total power limit protection is useless. Safety concern happens since there is no power limit to the PSU. The PSU may operate at over power till it burns out.

FIG. 1 is a perspective diagram showing the current mode control of a PWM controller, in which an error signal Vcomp represents the difference between the output voltage of the power converter and a target value, a current sense input Vcs is a feedback signal of inner loop of the PWM controller and represents the output current of the power converter, and a driver output Vgate is produced by the PWM controller for switching the power switch in the PSU. In normal operation, through an SR flip-flop 10, Vgate is triggered by a clock CLK and is ended depending on the comparison result of a comparator 12 comparing Vcs and Vcomp. A protection circuit 14 uses a comparator 16 to compare Vcs with a limit voltage Vlimit which determines the over current threshold of the power converter. Vcs rising to cross over Vlimit will trigger the output of the comparator 16 to reset the SR flip-flop 10, thereby turning off Vgate. If the current sense input Vcs is too small or zero, the power converter would operate at the maximum duty of Vgate and in burst mode. The output is regulated by the external voltage loop without any over power protection.

FIG. 2 is a perspective diagram showing the voltage mode control of a PWM controller, in which in normal operation, the driver output Vgate is also triggered by a clock CLK and is ended depending on the comparison result of a comparator 12 comparing the error signal Vcomp with a ramp signal Ramp. Similarly, when the current sense input Vcs rises to cross over the limit voltage Vlimit which determines the over current threshold of the power converter, the output of the comparator 16 will reset the SR flip-flop 10 so as to turn off Vgate. The current sense input Vcs is as the current limit of the power switch. If Vcs is zero, there is no total power protection.

As shown in FIGS. 1 and 2, the PWM controller relies on the comparator 16 monitoring the current sense input Vcs to provide over current or over power protection. In a conventional PWM controller, no matter using current mode control or voltage mode control, if there is no protection of Vcs=0, the current limit or total power limit would be un-functional.

Therefore, it is desired a detect circuit and protection logic to prevent such failure.

SUMMARY OF THE INVENTION

An object of the present invention is to provide a protection apparatus and method for a power converter. More particularly, the present invention provides an apparatus and method to protect a power converter when its current sense input is zero.

According to the present invention, a protection apparatus for a power converter comprises a comparator to compare a current sense input with a reference voltage to trigger a signal representing zero sense current, a fixed time duration generator to provide a fixed time duration in response to a clock, a gating logic to mask the signal representing zero sense current during the fixed time duration or an off period of a driver output, and a delay logic connected to the output of the gating logic. The gating logic asserts a signal representing failure at its output, and the delay logic will reset an enable signal to inhibit the driver output if the signal representing failure is asserted over a predetermined time period.

According to the present invention, a protection method for a power converter comprises comparing a current sense input with a reference voltage to trigger a signal representing zero sense current, providing a fixed time duration in response to a clock, masking the signal representing zero sense current during the fixed time duration or an off period of a driver output to assert a signal representing failure, and resetting an enable signal to inhibit the driver output if the signal representing failure is asserted over a predetermined time period.

The present invention provides a protection apparatus and method of detecting zero current sense input and then shutdown a PWM controller to avoid a PSU to burn out or suffer safety issue.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
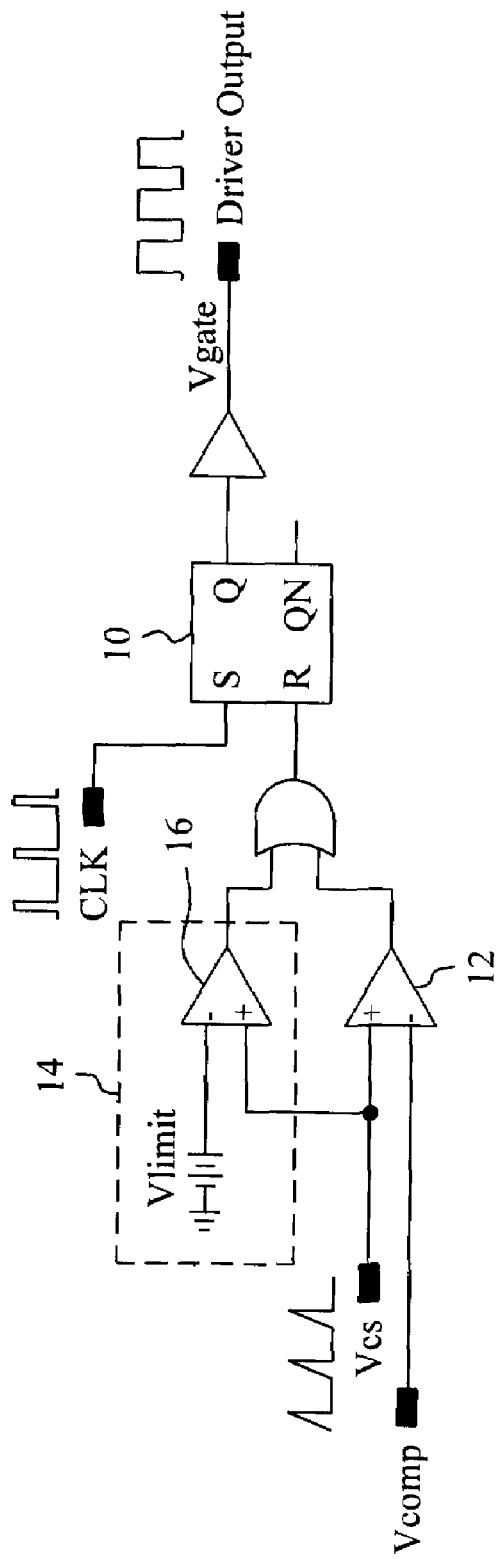
FIG. 1 is a perspective diagram showing the current mode control of a PWM controller.
Figure 2:
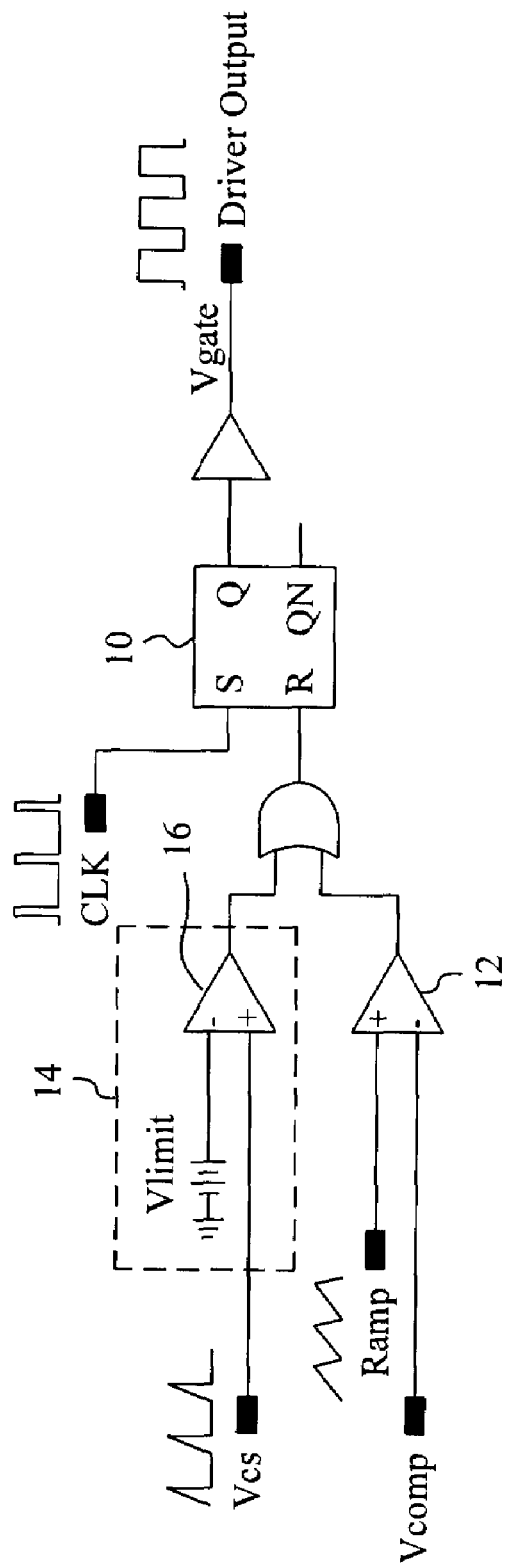
FIG. 2 is a perspective diagram showing the voltage mode control of a PWM controller.
Figure 3:
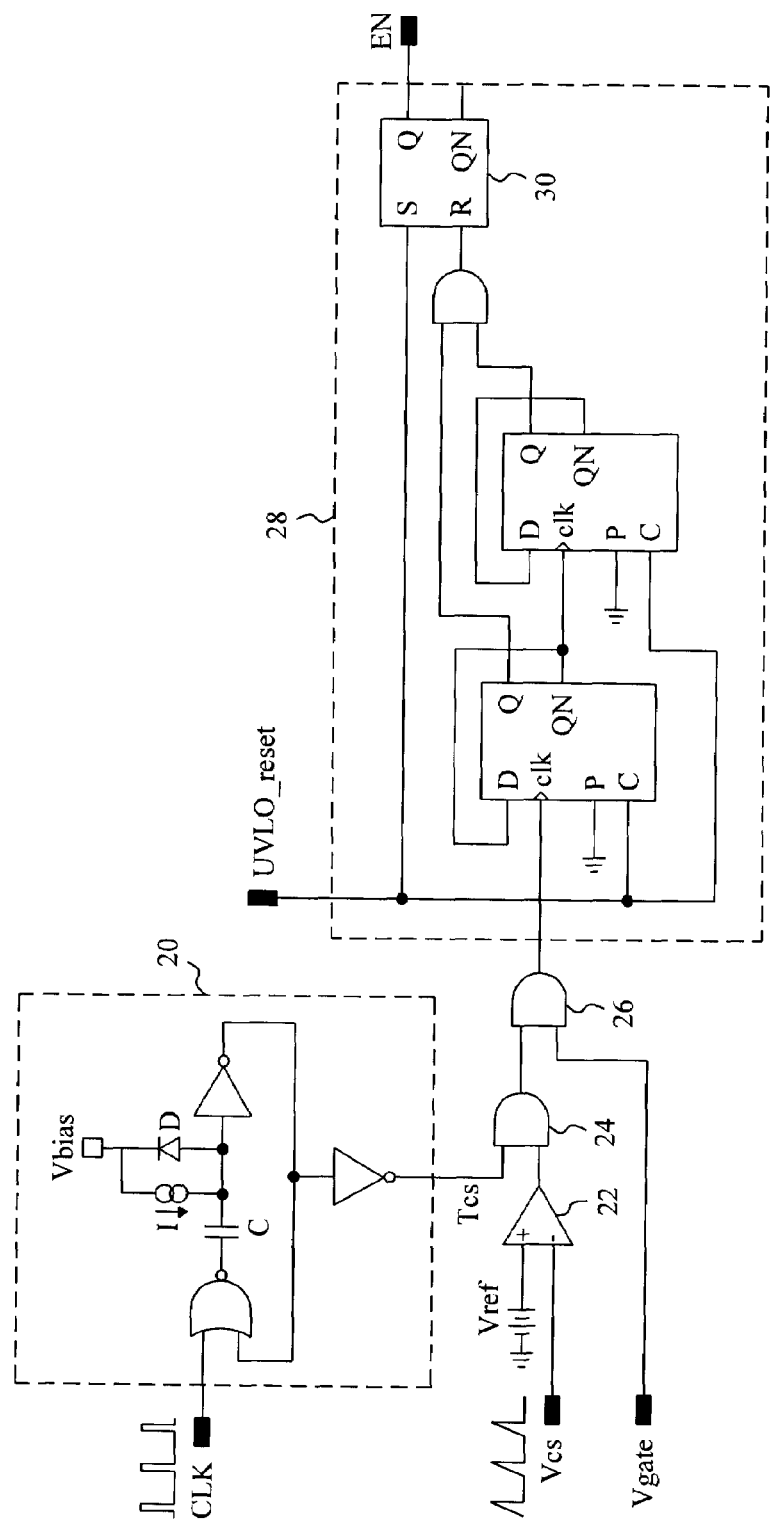
FIG. 3 is a circuit diagram of an embodiment according to the present invention.
Figure 4:
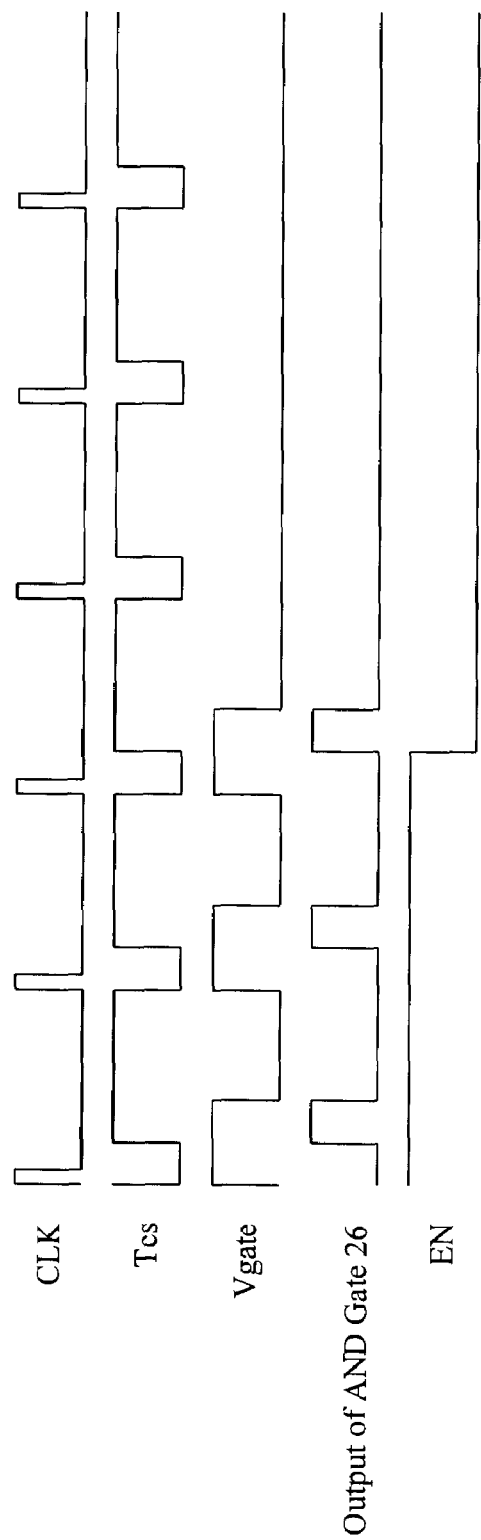
FIG. 4 is a waveform diagram of signals in the circuit of FIG. 3.

FIG. 3 is a circuit diagram of an embodiment according to the present invention, and FIG. 4 is a waveform diagram of signals in this circuit. In this embodiment, a protection apparatus has a comparator 22 to compare a current sense input Vcs with a reference voltage Vref to trigger a signal representing zero sense current at its output, a fixed time duration generator 20 in response to a clock CLK to provide a fixed time duration Tcs synchronous with the clock CLK, and a gating logic to assert a signal representing failure according to Vcs, Tcs and a driver output Vgate generated by a PWM controller. In the gating logic, an AND gate 24 has two inputs to receive the output of the comparator 22 and the fixed time duration Tcs so that the output of the comparator 22 will be masked by the AND gate 24 during the fixed time duration Tcs, which is to avoid misjudgment of Vcs=0 because Vcs may rise up from zero in each switching cycle of the PWM controller; and an AND gate 26 has two inputs to receive the output of the AND gate 24 and Vgate, so that the output of the comparator 22 will be masked by the AND gate 26 during the off period of Vgate. When Vcs is smaller than Vref, the output of the comparator 22 is logic 1, and the output of the AND gate 24 will be logic 1 after the fixed time duration Tcs. At this time, if Vgate is on, the output of the AND gate 26 will be logic 1. A delay logic 28 is connected to the output of the AND gate 26, and this logic will generate an enable signal EN to inhibit Vgate, if the failure, Vcs=0, happens in several cycles. The delay logic 28 has a counter to count the number of cycles where the signal representing failure is asserted to determine a predetermined time duration. When the signal representing failure happens over a predetermined number of cycles, the enable signal EN will be reset. This time delay or counter is to avoid that protection is mis-triggered during brownout test. The counter limit or delay time is decided by the system designer. The time delay or counter can be reset by a reset signal UVLO_reset of the PWM controller. The PSU of the power converter stops operating when the enable signal EN is latched, and is recovery till the latch 30 is reset by the reset signal UVLO_reset. Thus, over power operation or safety concern when Vcs=0 can be fixed.

It is appreciated that for those skilled in the art, the AND gates 24 and 26 may be replaced by any other gating logic for masking the output of the comparator 22 during Tcs or the off period of Vgate in order to assert the signal representing failure.

Figure 5:
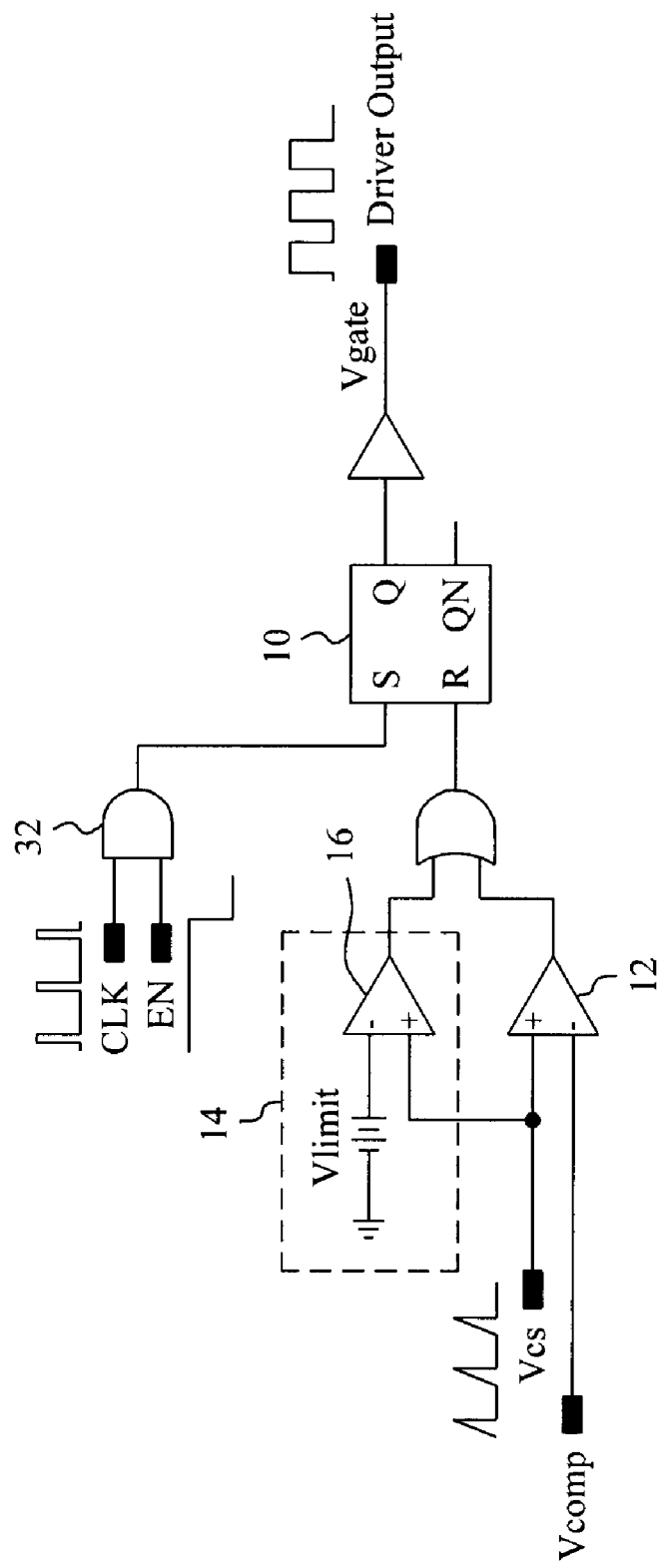
FIG. 5 is a circuit diagram of inhibiting a driver output by the enable signal of FIG. 3.

FIG. 5 is a circuit diagram of inhibiting the driver output by the enable signal EN. The PWM control loop and over current protection circuit 14 are similar to those in prior arts, except that the clock CLK is not directly injected into the set input S of the SR flip-flop 10 but is gated by an AND gate 32 with the enable signal EN. The output of the AND gate 32 is connected to the set input S of the SR flip-flop 10. In normal operation, the enable signal EN is logic 1 so that the clock CLK is the set signal S for the SR flip-flop 10, as is the case in prior arts. However, when the over current protection circuit 14 suffers failure so that Vgate keeps the output of the power converter being charged until the enable signal EN is switched to logic 0 to mask the clock CLK by the AND gate 32 to stop triggering Vgate, the PSU stops operating. The shutdown sequence when Vcs=0 is as shown in FIG. 4. After the failure is removed, the delay logic 28 is reset by the reset signal UVLO_reset so that the PSU resumes operation.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A protection apparatus for a power converter using a PWM controller to generate a driver output to modulate a duty of the power converter and use a current sense input to implement current limit or total power limit protection, the protection apparatus comprising:

a comparator comparing the current sense input with a reference voltage to trigger a signal representing zero sense current;

a fixed time duration generator generating a fixed time duration;

a gating logic coupled to the comparator and the fixed time duration generator, masking the signal representing zero sense current during the fixed time duration or an off period of the driver output, to assert a signal representing failure; and a delay logic coupled to the gating logic, to inhibit the driver output if the signal representing failure is asserted over a predetermined time period.

2. The protection apparatus of claim 1, wherein the predetermined time period is set by a predetermined number of cycles.

3. The protection apparatus of claim 1, wherein the delay logic resets an enable signal for inhibiting the driver output.

4. The protection apparatus of claim 1, wherein the delay logic comprises a counter coupled to the gating logic, to count the number of cycles where the signal representing failure is asserted.

5. The protection apparatus of claim 1, wherein the delay logic comprises a reset input to receive a reset signal to reset the delay logic.

6. The protection apparatus of claim 1, wherein the gating logic comprises:

a first AND gate coupled to the comparator and the fixed time duration generator, having two inputs to receive the signal representing zero sense current and the fixed time duration, respectively; and a second AND gate having two inputs to receive an output of the first AND gate and the driver output, respectively, to determine the signal representing failure.

7. A protection method for a power converter using a PWM controller to generate a driver output to modulate a duty of the power converter and use a current sense input to implement current limit or total power limit protection, the protection method comprising:

(A) comparing the current sense input with a reference voltage to trigger a signal representing zero sense current;

(B) providing a fixed time duration;

(C) masking the signal representing zero sense current during the fixed time duration or an off period of the driver output to assert a signal representing failure; and (D) inhibiting the driver output if the signal representing failure is asserted over a predetermined time period.

8. The protection method of claim 7, wherein the step D comprises setting the predetermined time period based on a predetermined number of cycles.

9. The protection method of claim 7, wherein the step D comprises resetting an enable signal once the signal representing failure is asserted over the predetermined time period.

10. The protection method of claim 7, further comprising counting the number of cycles where the signal representing failure is asserted.

\* \* \* \* \*